T. L. PARMETER.
STROPPING DEVICE.
APPLICATION FILED AUG. 11, 1915.
1,191,455.  Patented July 18, 1916.
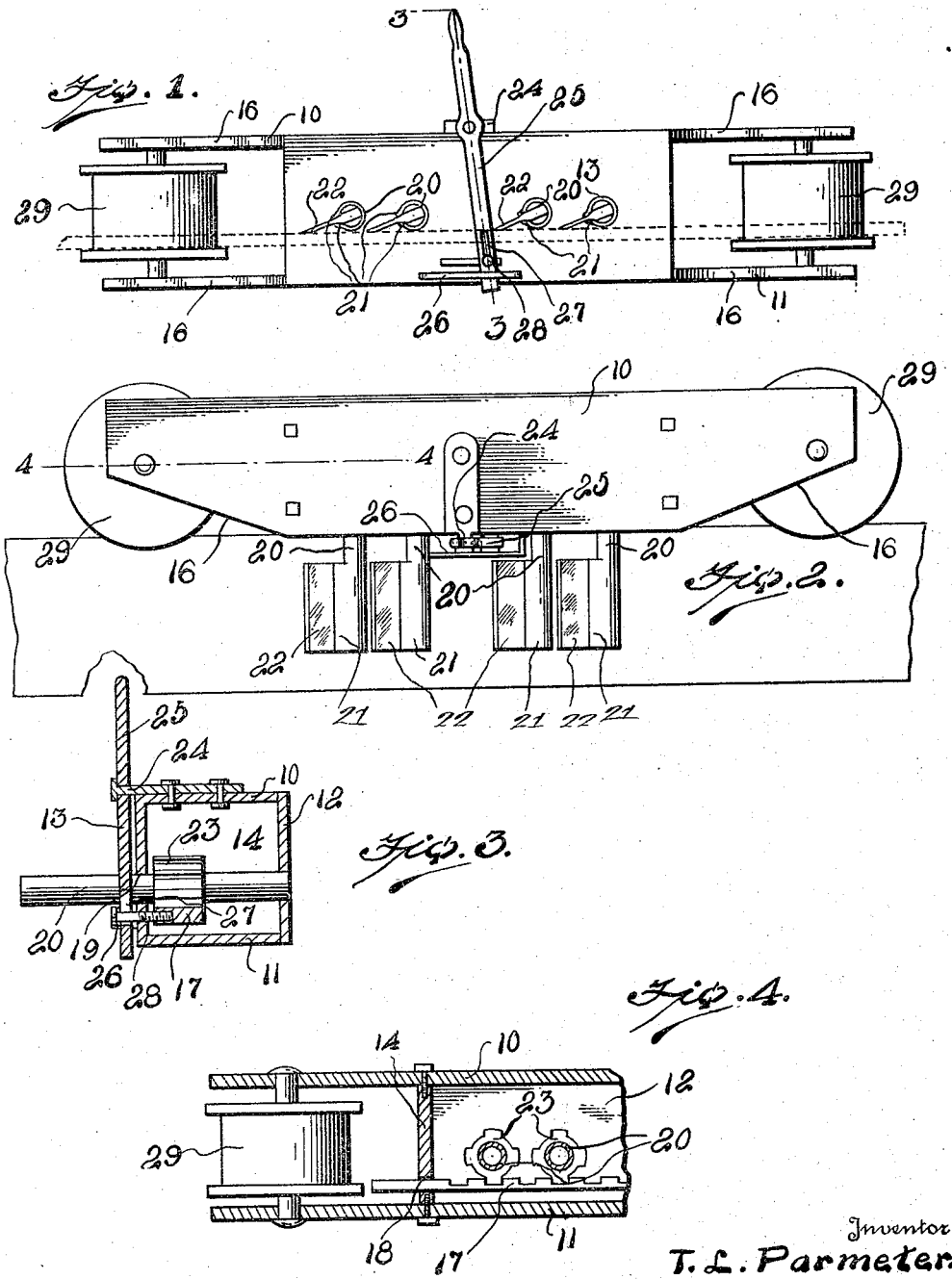
Witnesses
R. K. Stevens.
N. M. Test.
Inventor
T. L. Parmeter.

UNITED STATES PATENT OFFICE.

THOMAS L. PARMETER, OF WESTPORT, SOUTH DAKOTA, ASSIGNOR TO ROYCE PARMETER, OF WESTPORT, SOUTH DAKOTA.

STROPPING DEVICE.

1,191,455.  Specification of Letters Patent.  Patented July 18, 1916.

Application filed August 11, 1915. Serial No. 44,965.

*To all whom it may concern:*

Be it known that I, THOMAS L. PARMETER, a citizen of the United States, residing at Westport, in the county of Brown, State of South Dakota, have invented certain new useful Improvements in Stropping Devices; and I do hereby declare the following to be a full, clear, and exact description of the invention, such as will enable others skilled in the art to which it appertains to make and use the same.

This invention relates to improvements in stropping devices and particularly to devices for stropping safety razor blades.

Another object of the invention is to provide a device of this character in which a plurality of safety razor blades can be stropped at the same time.

Another object is to provide a device of this character including novel means for reversing the blades when the direction of movement along the strop is changed.

A further object is to provide a device of this character which is extremely simple and cheap in construction.

Other objects and advantages will be apparent from the following description when taken in connection with the accompanying drawing.

In the drawing: Figure 1 is an elevation of my improved stropping device, Fig. 2 is a top plan view, Fig. 3 is a transverse section on the line 3—3 of Fig. 1, and Fig. 4 is a longitudinal section on the line 4—4 of Fig. 2.

Referring particularly to the accompanying drawing, there is shown a base body in the form of a casing including top and bottom walls 10 and 11, side walls 12 and 13, and end walls 14. The top and bottom walls are cut away at corresponding angles, as indicated at 16. Within the casing is a longitudinally extending rack bar 17, the ends of which project through openings 18 in the end walls.

Formed in the side walls 12 and 13 are alining apertures 19 through which extend the transverse tubular shafts 20. One of the outer ends of each of the shafts is split longitudinally and formed with the radially extending resilient lips 21 between which is grasped a safety razor blade 22. On each of the shafts inwardly of the casing is a pinion 23 which meshes with the before-mentioned rack bar 17. Secured to the top wall and projecting over one of the sides is a stub shaft 24 on which is centrally pivoted a vertical lever 25. The lower end of this lever extends through a guide loop 26 mounted centrally on the lower side of the wall 13. In this lower portion of the lever is a vertical longitudinal slot 27 through which extends a pin 28 carried by the adjacent side of the rack bar 17. The upper end of the lever is provided with a suitable hand grip 28. The top and bottom walls extend suitable distances beyond the end walls and rotatably mounted between these projecting portions are the vertically disposed flanged rollers 29, said rollers being arranged for engagement with the edge of a strop.

In the operation of the device, razor blades are rested on the face of the strop and the rollers engaged against the edge of the strop. The handle is then grasped and the whole device moved toward one end of the strop. This rubs the edges of the blades against the face of the strop. When the device is given an initial movement in a direction toward the other end of the strop, the lever 25 will be shifted so as to move the rack bar 17 beneath the pinions 23 and rotate the shafts 20 to engage the other sides of the edges of the blades against the strop. Thus the device can be moved back and forth from one end of the strop to the other, and each time the direction of movement is changed the lever 25 will rock on its pivot to shift the rack bar thus rotating the shafts 20 and reversing the razor blades.

What is claimed is:

1. A stropping device for safety razor blades comprising a base body, rotatable elements carried by the ends of the body for engagement with the edge of a strop, transverse shafts mounted in the body and extending through one side thereof where they are provided with razor blade gripping members, a rack bar slidable longitudinally in the body beneath the shafts, pinions carried by the shafts and engaging the rack bar, and means carried by the body and connected to the rack bar for moving the rack bar to partially rotate the shafts in opposite directions.

2. A stropping device for safety razor blades comprising a base body having rollers for engagement with the edge of a strop, rotatable blade holders carried by the body, and a handle movably carried by the body for partially rotating the blade holders in opposite directions for alternately engaging the opposite sides of the edges of the blades with the strop.

In testimony whereof, I affix my signature, in the presence of two witnesses.

THOMAS L. PARMETER.

Witnesses:
R. G. BROOKS,
L. A. BROOKS.

Copies of this patent may be obtained for five cents each, by addressing the "Commissioner of Patents, Washington, D. C."